United States Patent [19]

Gigandet et al.

[11] Patent Number: 4,615,014

[45] Date of Patent: Sep. 30, 1986

[54] BAKE TIME DISPLAY FOR COOKING OVEN

[75] Inventors: Richard W. Gigandet, Fort Wayne; Stephen A. Batti, Martinsville, both of Ind.

[73] Assignee: Lincoln Manufacturing Company, Inc., Fort Wayne, Ind.

[21] Appl. No.: 601,236

[22] Filed: Apr. 16, 1984

[51] Int. Cl.[4] .................................. G06F 15/46

[52] U.S. Cl. .................................. 364/557; 364/569; 99/335; 99/386; 219/388; 219/492

[58] Field of Search ......... 219/412, 388, 492, 10.55 B; 99/386, 336, 384, 335; 364/900, 705, 569, 468, 557, 400, 477, 184, 186

[56] References Cited

U.S. PATENT DOCUMENTS

| | | | |
|---|---|---|---|
| 4,225,776 | 9/1980 | Meisner et al. | 219/492 |
| 4,244,285 | 6/1981 | Baker | 99/386 |
| 4,318,181 | 3/1982 | Kawakami et al. | 364/569 |
| 4,403,302 | 9/1983 | Young et al. | 364/900 |
| 4,410,795 | 10/1983 | Shigeki | 219/492 |
| 4,503,502 | 3/1985 | Chapin | 364/400 |
| 4,504,716 | 3/1985 | Sakamotto | 219/10.55 B |

OTHER PUBLICATIONS

"Red Lion" Controls Catalogue, pp. 0, 13, 19.
Robertshaw Controls Company Catalogue, Appliance Controls.

*Primary Examiner*—Errol A. Krass
*Assistant Examiner*—Danielle Laibowitz
*Attorney, Agent, or Firm*—Jeffers, Irish & Hoffman

[57] ABSTRACT

A bake time display system for use on a food cooking oven which includes a drive motor and a food conveyor for transporting food through the oven. The bake time display includes a speed transducer which is directly coupled to the oven's motor and conveyor to provide an accurate indication of conveyor speed. A preprogrammed microprocessor computing circuit is connected to receive the signal from the speed transducer and is programmed to compute therefrom the average baking time of an article of food passing through the oven. In one mode of operation, the system displays the average baking time only when the average baking time differs from a preset baking time by a predetermined limit and may be manually conditioned to display average baking time continuously when the baking time is being adjusted.

20 Claims, 9 Drawing Figures

BAKE TIME DISPLAY FOR COOKING OVEN

BACKGROUND OF THE INVENTION

Field of the Invention

The present invention relates to devices for displaying the cooking time of products cooked in automated conveyor ovens such as are typically used in the preparation of pizza, baked goods and the like, and in particular to such a display system incorporating a computing circuit and transducers coupled to provide true cooking time parameters to generate a display of average cooking time when it deviates from prescribed limits.

Automated commercial ovens for the preparation of food are widely used. One class of such ovens are those in which the oven cooking chamber is maintained at a specific cooking temperature or temperatures and food is transported through the oven by means of a conveyor. Typical of such ovens, for example, are those used to prepare pizza. Impingement ovens are also known wherein the food product is heated or cooked by means of streams of hot air impinging thereon as it moves through the oven on the conveyor. Application Ser. No. 386,610, now U.S. Pat. No. 4,438,572, filed June 9, 1982 discloses such an oven, and this application is expressly incorporated herein by reference.

Numerous characteristics of the food such as texture and flavor are directly affected by the length of time required for the food to traverse the oven. Such factors can be even more critical when such ovens are used in such large franchise type operations where the maintenance of uniformity in such characteristics is essential. Accordingly, a variety of such ovens have been developed which provide for control of the operating speed of the conveyor and, correspondingly, the "cooking or baking time". Typically, prior art ovens of this type are provided with a set point controller operatively coupled to the drive motor for the oven's conveyor. In this type of system, some parameter of the conveyor drive motor is controlled, such as, for example, the drive motor armature voltage. However, it has been found that, because prior art control systems monitor an input to the oven rather than the output, substantial variations in bake time can result and can do so without being detected. For example, excessive loading or binding of the conveyor system can cause the conveyor to slow substantially even though a controlled parameter such as armature voltage is maintained constant. Accordingly, while such systems can be periodically checked by means such as a stop watch, such methods are tedious, prone to be neglected, and do not provide an accurate and simple control of this essential parameter to the desired accuracy.

The input speed of the prime drive element can be monitored continuously, however, in addition to the above-discussed problems, it is not uncommon for input speed variations to fluctuate at a relatively high rate. A common result is that an operator, noticing a particular fluctuation, will change the conveyor speed to correct and this adjustment may itself be too large or the variation in speed may be a temporary occurrence whereby the alteration of the oven's bake time set point will itself produce an error. This is particularly true when the oven operator is a relatively unskilled person, which frequently occurs in large franchised restaurant chains.

Accordingly, there exists a need for an improved bake time control and display system for use with a food preparation oven which will obviate these difficulties.

SUMMARY OF THE INVENTION

The present invention, in one form thereof, is a bake time display system for use on a conveyorized food cooking oven which includes a variable speed drive motor and a conveyor for transporting food through the oven in a predetermined period of time. The bake time display system ("display system" hereinafter) includes a transducer means operatively coupled to the conveyor and/or drive motor of the food oven for generating a signal, such as a series of speed pulses which are proportional in frequency to the actual speed of the conveyor. The system further includes a timing signal generating means for generating a timing interval signal of predetermined frequency and a computing circuit which is connected to receive the speed signal and the timing interval signal. The computing circuit, typically a microprocessor, is programmed with a predetermined algorithm for repetitively computing the average speed of the conveyor over a predetermined period of time. The computing circuit computes from this value the actual bake time, compares the bake time to a currently displayed bake time, and, if the system is in the static mode, generates a display signal corresponding to the true bake time when the bake time differs from the currently displayed bake time by a predetermined value. When the system is in the dynamic mode, which occurs by the operator actuating a switch, the current average bake time is displayed and all fluctuations and average bake time will effect the display until the system is returned to the static mode. The purpose of this is to portray to the operator only those fluctuations in bake time which fall outside a certain window, whereas the dynamic display is necessary to enable the operator to fine tune the oven or to control the proper bake time.

In specific embodiments of the invention, the display system may also be provided with means to alter the algorithm of the computing circuit to display the true bake time of the oven instantaneously and continuously. The system may also incorporate a temperature sensing means for measuring the temperature of the food cooking oven. The system may also be provided with circuitry which enables the system to operate on different line frequencies, typically 50 or 60 hertz, and a binary switch device can be used to alter the parameters to effect different time frequency, motor type, etc.

It is therefore an object of the invention to provide an improved bake time display system for use with a food cooking oven.

Another object of the invention is to provide such a control system for indicating true oven bake time.

Still another object of the invention is to provide such a display system including a computing circuit which determines average conveyor speed over predetermined time intervals and automatically displays bake time when the bake time varies from a currently displayed value by a predetermined percentage.

Another object of the invention is to provide such a display system operable between a static mode in which the bake time display is updated only if outside operating limits and a dynamic mode in which the bake time display is updated continuously.

Yet another object of the invention is to provide such a control system which computes conveyor speed at a relatively high repetition rate and computes an average conveyor speed over a longer time interval to eliminate the display of momentary conveyor speed and bake time variations not representative of true average conveyor speed and bake time.

Another object of the invention is to provide such a display system which includes a plurality of manual constant input switches for modifying the algorithm of the computing circuit means for various system parameters such as electrical source frequency, and motor type.

Still another object of the invention is to provide such a display system which incorporates low cost solid state components without loss of accuracy or reliability.

DESCRIPTION OF THE DRAWINGS

The aforementioned features and advantages of the present invention and the manner of attaining them will become more apparent and the invention itself will be better understood by reference to the following description of an embodiment of the invention taken in conjunction with the accompanying drawings wherein.

DESCRIPTION OF THE PREFERRED EMBODIMENT

Figure 1:
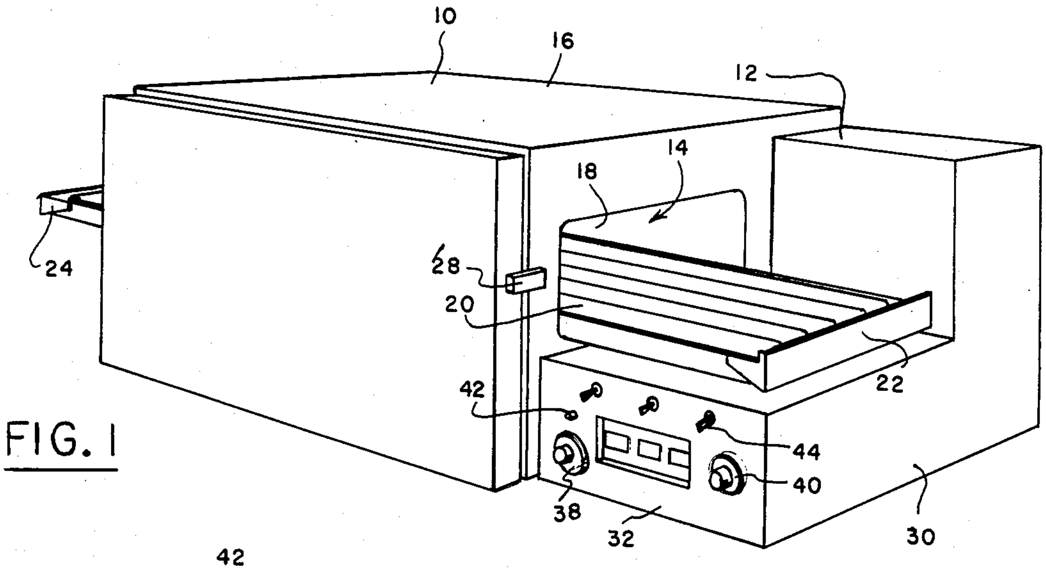
FIG. 1 is a perspective drawing showing a conveyorized impingement food preparation oven with the display system of one embodiment of the present invention incorporated therein.

Referring now to the drawings, there is shown in FIG. 1 a perspective drawing of a food preparation oven 10 having mounted thereon a bake time display system 12 in accordance with the present invention. The oven 10 comprises a cooking chamber 14 within a generally rectangular insulated housing 16 and provided with any of a variety of heating elements such as electrical resistance heaters, gas heaters, impingement ducts or the like (not shown). A food inlet opening 18 is provided in one end of housing 16 and a food outlet opening (not shown) is provided at the opposite end of the housing 16. A motorized conveyor 20 extends through the oven 10, with the opposite ends 22, 24 thereof extending outwardly from the inlet and outlet openings a distance sufficient to allow placing food items onto the conveyor 20 and removing them after the food has passed through the cooking chamber.

Typically, the conveyor 20 is driven by a variable speed electric motor, usually a direct current (DC) motor operated from a rectified alternating line power supply to facilitate variable speed control. Housing 16 is provided with a removable or pivoted door as at 26 secured by means of a latch 28 to facilitate maintenance of the oven interior.

The control system is shown enclosed in an "L" configured enclosure 30 having a control and display panel 32 on one side thereof positioned to be conveniently viewed and used by an operator.

Figure 2:
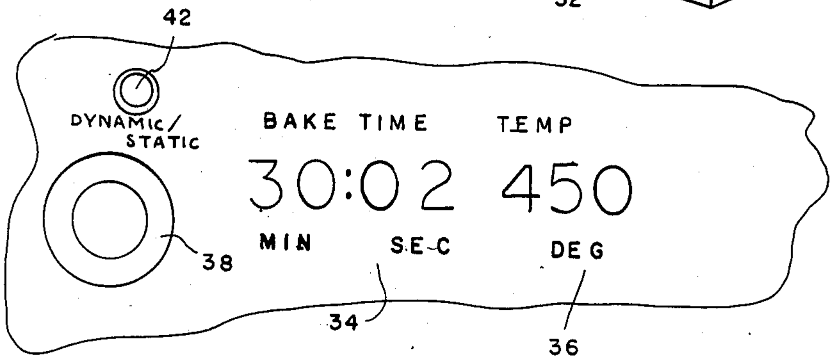
FIG. 2 is a front plan view showing details of the control system display and control panel.

Referring specifically to FIG. 2, the display panel 32 is provided with a plurality of segmented alpha-numeric display elements, there being sufficient elements to display bake time in minutes and seconds separated by a colon as at 34, and to display temperature in three digit numbers accompanied by a degree sign as at 36. A pair of manually operable control knobs 38, 40 used to adjust the motor speed and temperature of chamber 14, respectively, a momentary contact "dynamic/static" push button 42 adjacent the speed set knob 38, and a plurality of two position switches as at 44 for activating the conveyor, fan and heat source are also located on panel 32.

Figure 3:
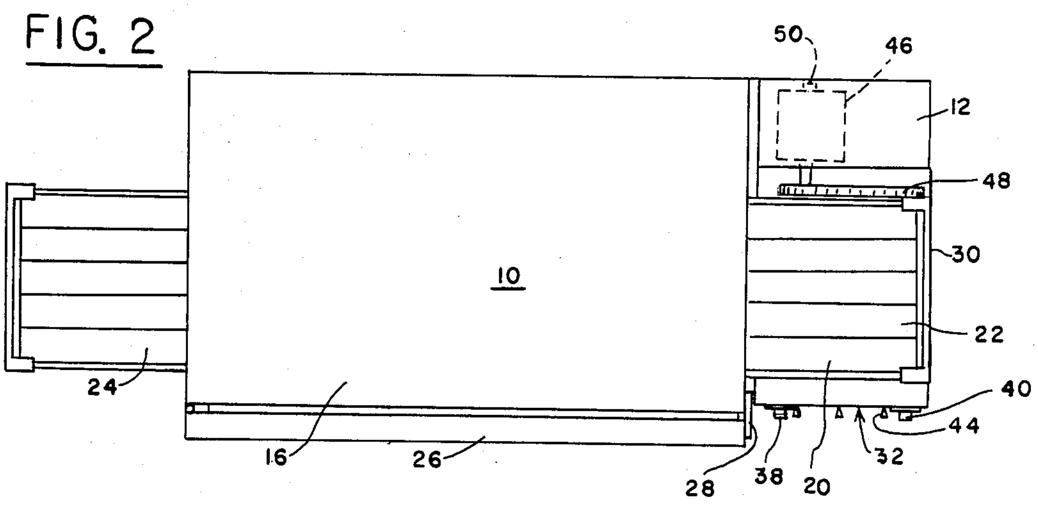
FIG. 3 is a top plan view of the bake oven of FIG. 1.

As can best be seen in FIG. 3, the conveyor 20 is driven by the motor 46, which is disposed within the housing 30, by means of a chain and sprocket as at 48 in conventional manner.

In operation, an item to be cooked is placed on the end 22 of the conveyor 20 from which point it is conveyed through the oven 10 until it exits on the outwardly extending end 24 of the conveyor 20. The speed of the conveyor is relatively constant such that the amount of cooking time for the article of food is directly proportional to the speed of the conveyor 20 and the length of the oven enclosure 16 through which it passes.

Figure 4:
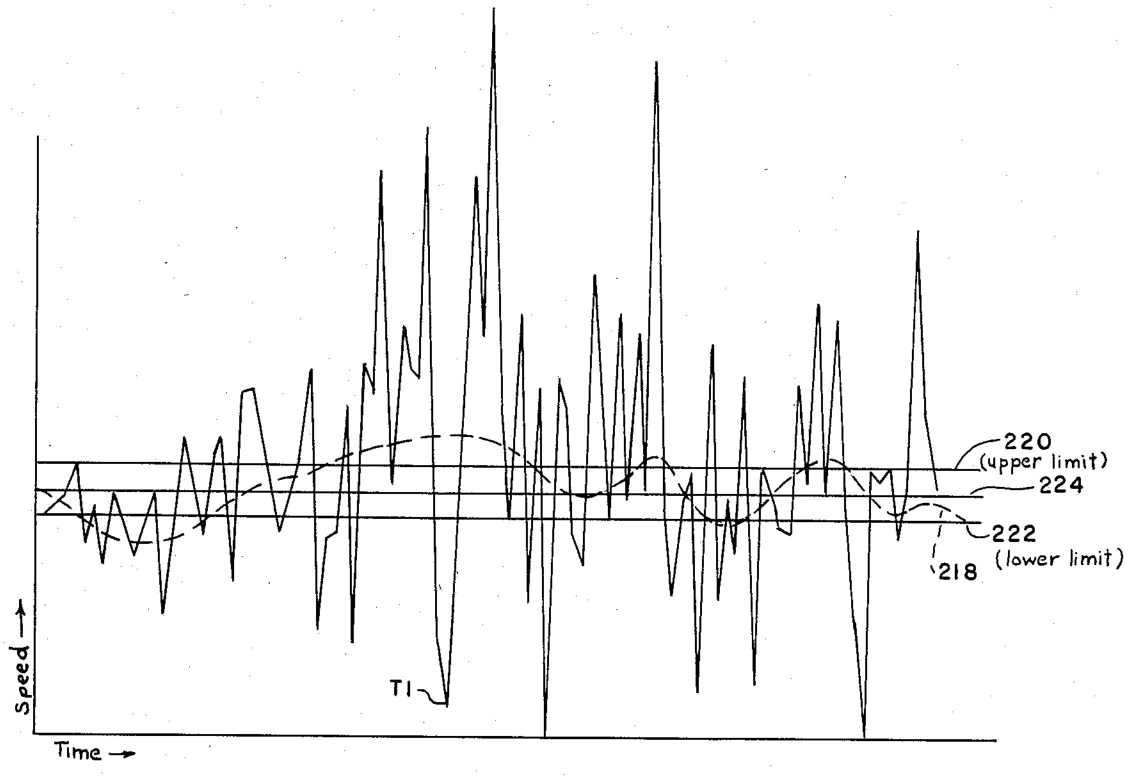
FIG. 4 is a speed versus time chart useful in explaining the operation of the system.

In practice, it has been found that the instantaneous speed of the output shaft 50 of the motor 46 varies substantially from moment to moment. A chart showing typical sample data of instantaneous speed is shown in FIG. 4, the chart showing actual speed changes occurring over a time period of about 17 minutes with variations in speed being shown as a percentage of set speed the maximum speed changes being 25% in actual experience. If this speed were simply to be displayed it will be apparent that two significant problems are encountered. First, the speed indication, because the speed itself is changing substantially, will be shown as a relatively erratic value thereby making it difficult for an operator to determine the actual speed of the conveyor and the bake time of foodstuffs which can be determined therefrom. Secondly, if an operator relies upon any particular instantaneous reading of conveyor speed or bake time, any corrections to the set point of the motor 46 speed can be inaccurate and may, in fact, be in total error such as might occur if the speed were to be set on the basis of a reading taken at time T1 in FIG. 4 which indicates reduced speed when in fact the average speed has increased.

It is also apparent that while zero speed fluctuation would be ideal, actual experience has proven that variations of $\pm 2.5\%$ in conveyor speed, which will produce a corresponding variation in bake time of about 5 or 10 seconds in a typical oven, are fully acceptable without any apparent adverse effect on the quality and characteristics of the food being cooked in the oven. It has accordingly been determined that while it is not necessary to monitor the actual instantaneous speed of the conveyor, it is necessary to determine an average speed and correspondingly, average bake time to provide useful control information for the oven operator. It has also been found desirable to display updated bake time only when the average bake time varies from the currently displayed bake time outside acceptable limits, thereby reducing operator confusion and the tendency of an unskilled operator to effect frequent and unnecessary alterations of the motor speed. Accordingly, the display system 12 described in detail below is provided.

Initially, it is necessary to have an accurate indication of the actual speed of the conveyor. It should be noted that in prior art ovens, the speed has been provided on an appropriately calibrated scale on a display device which in fact displays some motor parameter such as armature voltage. Since in fact motor speed can vary without any variation in such parameters as armature voltage, this type of speed measurement has proven to be unreliable and unsuitable. Accordingly, in the present system, the actual motor output shaft speed is monitored and measured. Since the motor is directly mechanically connected to the conveyor, measurement of rotational speed of the motor output shaft provides a positive and reliable indication of conveyor speed.

Figure 5:
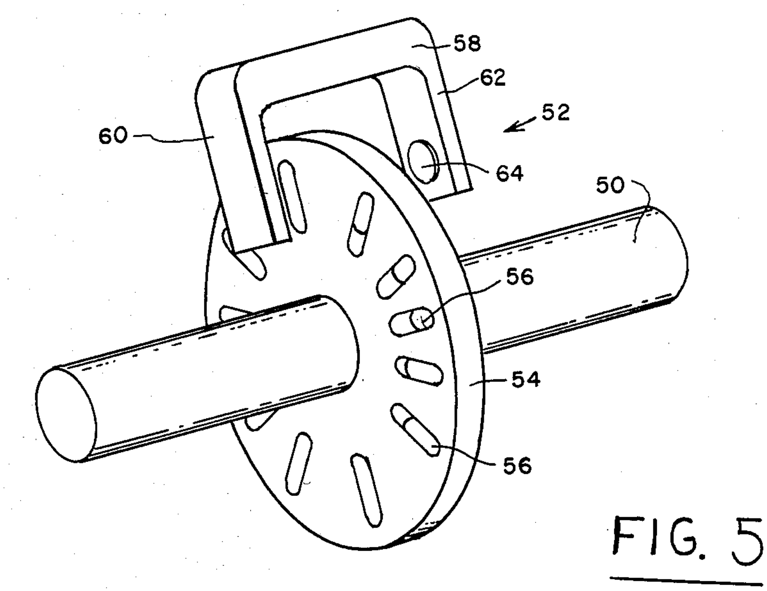
FIG. 5 is a perspective drawing showing diagrammatically a speed pulse generating device.

For this purpose, there is provided, as shown diagrammatically in FIG. 5, a photoelectric pulse generating device indicated generally at 52 which will generate an electrical pulse signal for each predetermined incremental rotation of the output shaft 50 of the motor 46. The transducer 52 comprises a disc 54 directly mechanically connected to the output shaft 50 and provided with a plurality of circumferentially spaced slots therethrough as at 56. A U-shaped member 58 is conveniently mounted to the housing of motor 56 in a position with its opposite legs 60, 62 disposed adjacent the longitudinally opposite surfaces of the disc 54. A photoresponsive device such as a photovoltaic cell or photodiode 64 and a light emitting device such as a lightemitting diode or incandescent bulb are mounted in the opposite legs 60, 62 such that light will pass from one to the other each time a slot 56 passes. This in turn will produce a series of pulses, there being one such pulse for each slot. The pulses will occur at a frequency which is directly proportional to revolutions per minute of the motor output shaft 50 and, because of the mechanical connection thereof to the conveyor 20, will provide a pulse signal having pulses occurring at a repetition rate that is directly proportional to conveyor speed.

Figure 6:
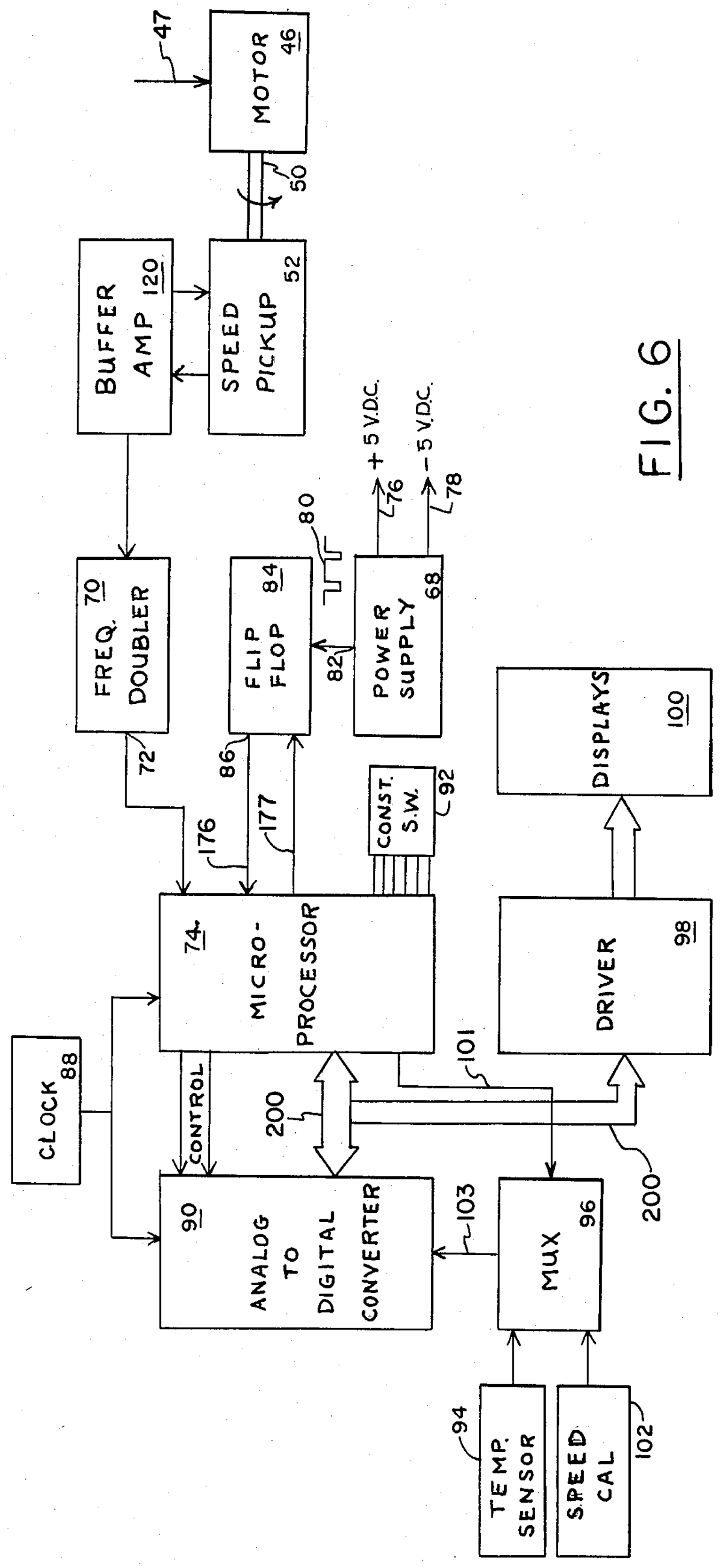
FIG. 6 is a block diagram of the display system.

Referring now to FIG. 6, there is a complete block diagram of the display system 10 of the present invention. The motor is shown diagrammatically at 46 having a motor speed control input 47 and is mechanically coupled by output shaft 50 to the speed pulse generator or speed pickup 52 above-described. The speed pickup 52 is typically provided with a low voltage power supply from the system power supply 68.

A repeating pulse train proportional to the rotational speed of the output shaft 50 is fed to a frequency doubler circuit 70 through amplifier 120 to produce a frequency output signal at its output terminal 72 which is double that of the output of pickup 52. The use of a frequency doubler 70 enables speed pickup 52 to be constructed with fewer slots, thereby resulting in better shaped pulses, yet the high resolution achieved by a higher frequency pulse train can still be realized.

A power supply 68 is provided, the power supply being connected to a conventional 60 hertz or 50 hertz line voltage source. The power supply 68, in addition to providing the required regulated DC +5 and −5 volt sources 76, 78, also provides a reference clock pulse signal indicated at 80 on its output terminal 82. This timing signal is derived from the zero voltage crossings of the AC source, and the pulses 80 are conditioned to provide a precise timing signal. A flip-flop circuit 84 passes the timing signal from its output 86 to the microprocessor computing circuit 74 for gating and timing purposes.

A clock circuit 88, which may also be of any conventional configuration such as a crystal controlled clock or a free running multivibrator, provides clock signals for microprocessor 74 and analog to digital converter 90.

A multi-terminal dipswitch 92 is coupled to appropriate inputs of the microprocessor 74 to input binary constants which correspond to various parameters of the mechanical system such as gear ratios, motor type, and line frequency.

While not specifically a part of the present invention, the display circuit 10 is also typically provided with a temperature sensing device 94, typically an analog thermistor or similar negative resistance temperature sensor. The output from the temperature sensing device 94 is passed through a multiplexer 96 into the analog to digital converter 90 from whence it is inputted to microprocessor 74 by bus 200, which connects to a display driver circuit 98 by bus 200, which in turn drives a conventional segmented display 100. The multiplexer is driven by line 101 from the microprocessor 74 whereby the multiplexer is controlled to pass either the temperature data or speed calibration data to converter 90 on line 103.

Speed calibration circuit 102 is provided to modify computational constants of the microprocessor computing circuit 74 for calibration purposes.

Figure 7:
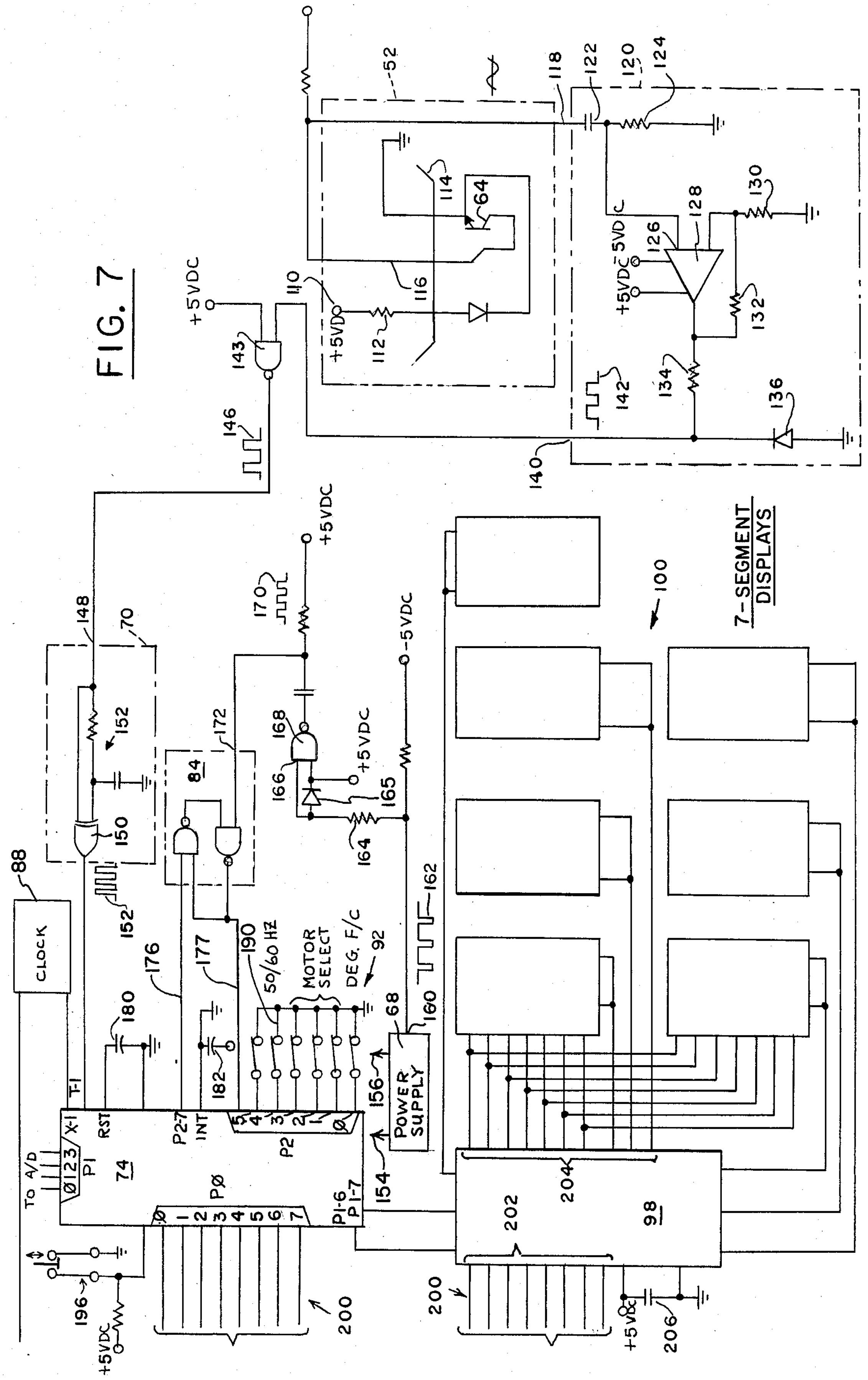
FIG. 7 is a circuit diagram showing the circuitry of the display system.

Referring now specifically to FIG. 7, the circuitry of the control system 12 is shown in more detail. The speed pickup 52 is coupled to the power supply 68 by terminal 110 and includes a 150 ohm resistor 112 which applies operating potential to a TIL 159 optical interrupter 114. Interrupter 114 comprises, internally, a diode and transistor solid state device which is photooptically responsive to the presence and absence of light to produce a corresponding high low output signal at its output terminal 116. This signal, which is substantially a sine wave at higher frequencies, passes by signal line 118 to the input of a buffer-amplifier circuit 120. The buffer-amplifier 120 includes a 0.1 microfarad coupling capacitor 122 which feeds the output of speed pickup 52 across a load resistor (10K ohms) 124 to the input terminal 126 of an LM 741 CN operational amplifier 128. The operational amplifier 128 is biased and loaded by means of 27K resistor 130, one megohm resistor 132 and 4.7K ohm resistor 134, and is also coupled to the DC voltage terminals of the power supply 154, 156. A clamp diode 136 clips negative going signals and the output signal from the buffer-amplifier appearing at its output terminal 140 is a clean 5 volt square wave signal 142 having a frequency identical to the output frequency of the speed pickup 52. The square wave signal 143 is passed through a NAND gate 142 which again functions primarily as a buffer and amplifier. The output signal, still a square wave signal as shown at 146, is applied to the input terminal 148 of the frequency doubler circuit 70. Frequency doubler 70 comprises an exclusive OR gate 150 having its inputs connected directly to input terminal 148 and to terminal 148 through resistance-capacitor charging network 152. In operation, the frequency doubler circuit 70, thus configured, responds to each positive and each negative transition of signal 146 to produce a resulting square wave output signal shown at 152 having twice the frequency of the signal 146. Circuit 70 in effect doubles the number of apparent pulses generated by speed pickup 52, thereby enabling a fewer number of slots in speed pickup 52 yet utilizing a higher frequency pulse train, with concomitant better resolution, for input to microprocessor 74.

Power is supplied to the system by means of a low voltage, regulated direct current supply 68. This circuit can be of any desired configuration as well known to those skilled in the art, the device in the present invention providing a +5 volts DC and a −5 volt DC sources 154, 156 compatible with the components used in the system. Power supply connecting lines are not shown for clarity.

The power supply 68 is also provided with an output terminal 160 from which is tapped a low voltage, pulse signal indicated at 162, there being a negative going edge for each zero crossing of the conventional 60 or 50 hertz line voltage which feeds the power supply 68. This can be obtained via a simple resistor-capacitor network (not shown) in the power supply. The signal 162 is fed through a 27K ohm limiting resistor 164, and clipped by a 165 diode connected to one of inputs 166 of NAND gate 168. The output of NAND gate 168 passes through a 0.001 microfarad capacitor to provide a narrow clock pulse signal, shown at 170, having double the line frequency. Signal 170 is fed into the input terminal 172 of an RS flip-flop 84 which comprises a pair of NAND gates. The outputs 176 and 177 of the flip-flop 84 are fed to pins 38 and 6 of computing circuit 74. As will be explained in more detail below, the signals tell the microprocessor computing circuit 74 that a zero crossing has occurred in the line voltage and this in turn is utilized as a timing interval to read internal counters of the computing circuit 74 which accumulate or count the pulses 152 coming from the speed pickup 52 on pin 39.

Computing circuit 74, an 8748 microprocessor manufactured by Intel in the working embodiment, is provided with specified reset and decoupling capacitors 180, 182 on pins 4 and 7.

A plurality of two position switches 92 are connected to the pins 21, 22, 23, 24, 35 and 36 of microprocessor 74. These inputs in essence provide a binary coded input or signal to microprocessor 74. That is, each combination of open and closed switches provides a different binary coded number. Each binary coded number in turn corresponds to a specific combination of constants information necessary in performing computations. For example, switch 190 will indicate 50 or 60 hertz input frequencies depending on whether the switch is opened or closed, respectively. Three of the switches provide a number which corresponds to motor type and speed, gear ratio and the like. One the switches may provide for selection of a coded signal to effect temperature display in degrees Fahrenheit or degrees Centigrade. "Look Up" tables for the temperature scales are contained within the microprocessor memory.

Connected to the input pin 1 of microprocessor 74 is a two position switch 196 which is denominated the "static/ dynamic" switch. As will be explained in more detail below, this switch conditions the microprocessor 74 to operate in one of two display modes. Binary coded input signals are also fed into the microprocessor 74 via bus 200 (Pins 12–19) from the analog to digital converter 90 to provide input of temperature data from the oven.

Computing circuit 74 multiconductor output bus 200 carries a binary coded decimal number indicative of the bake time and temperature of the oven 10 based upon computed data as explained below. This data is, in turn, fed into the input terminals 202 of an ICM 7218A (manufactured by Intersil) display driver circuit 98, which again is described in detail in the manufacturer's specifications. Driver circuit 98 accepts binary coded decimal information, and produces a seven segment code output at its terminals 204 compatible with the alpha-numeric display devices 100 along with relevant information pertaining to digit position, decimal point, and also provides latching and appropriate driving circuitry. The information transmitted to the terminals 204 is fed to the display devices 100.

An appropriate capacitor is provided at 206 as well as ground connections and power supply connections, again in accordance with manufacturers specifications.

Figure 8A:
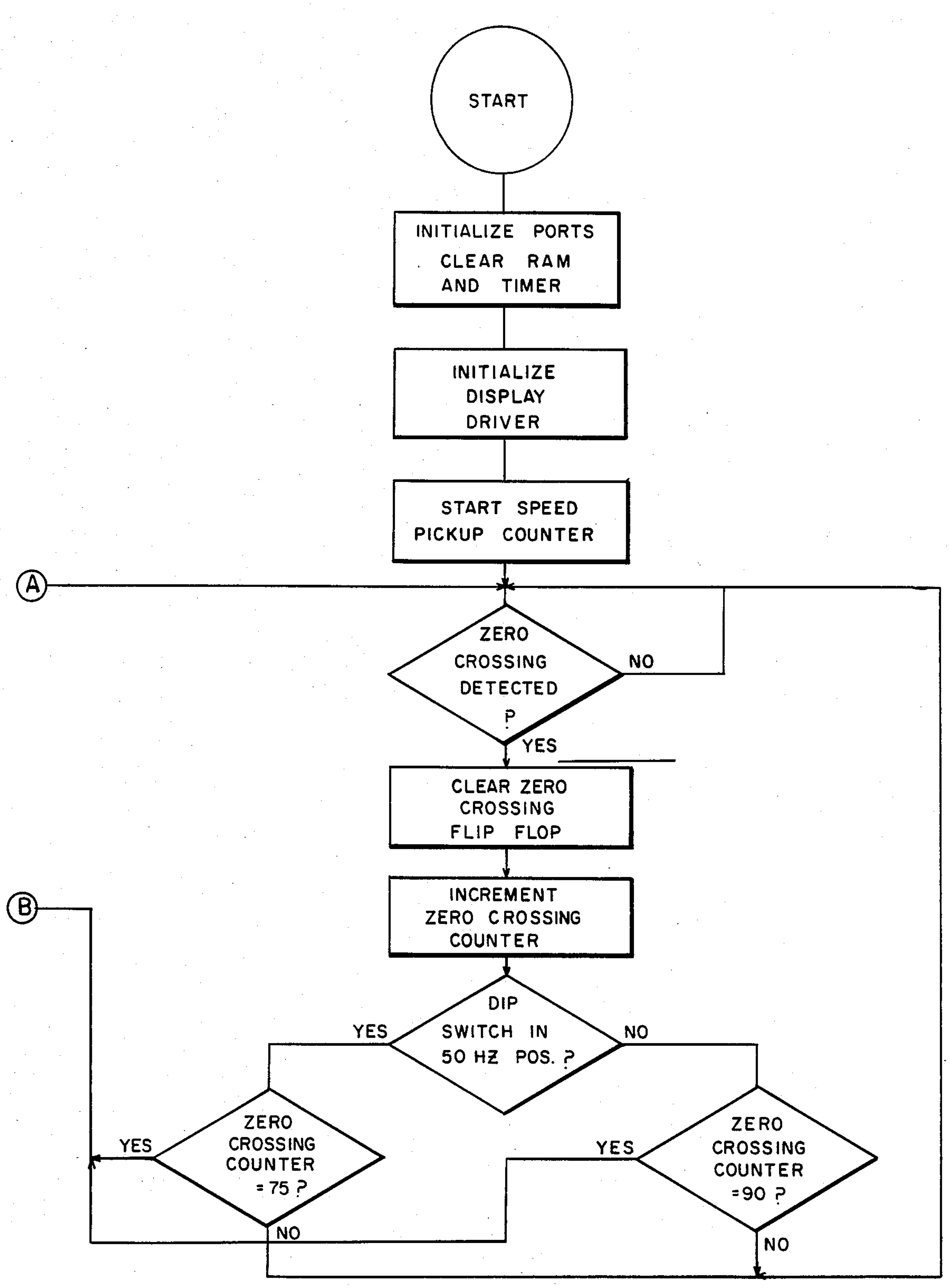
FIGS. 8*a* and 8*b* are a flow chart useful in explaining the computing algorithm of the display system.
Figure 8B:
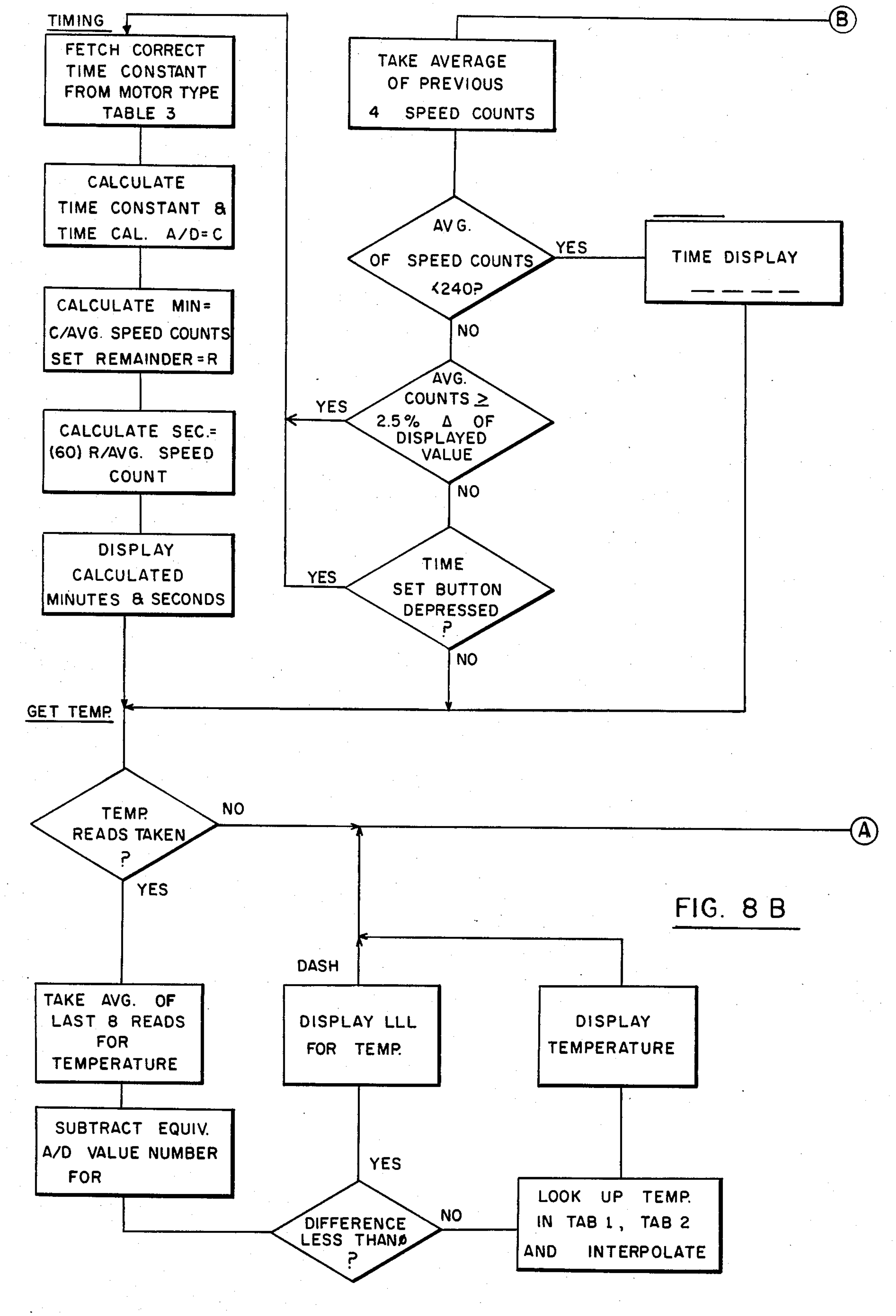

Referring now to FIGS. 8*a* and 8*b*, there is shown a flow diagram useful in explaining the programmed computational sequence of the system 12.

Referring first to FIG. 8*a*, the sequence of decisions and computations begins in the circle labeled "START". In sequence, the system initializes its internal memories, data ports and timers. A signal is sent to initialize the display driver 98 and to activate an internal counter identified as the "speed pickup counter" which is coupled to receive the speed pickup 52 signal 152 at terminal T1. The start up sequence will not be repeated again unless the system is turned off and restarted.

The next sequence in the logic is to count the number of zero crossings of the line voltage. This is done by counting the signals received at terminal P2–7 which is the pulse signal derived from the zero crossings as explained above. If no zero crossing has been detected the system simply continues counting the input pulses from the speed pickup 52. When a zero crossing has been detected, corresponding to a predetermined time interval, the computing circuit 74 resets the flip flop circuit 172 and simultaneously inputs a count to an internal counter denominated the zero crossing counter. The value in the zero crossing counter is then compared to a predetermined value loaded into computing circuit 74 via its programming. If the system is operating on 50 hertz signals, the count is 75. If the system is operating on 60 hertz the count constant is 90. If the value in the zero crossing counter has not reached either 75 or 90 as required, the system loops back and repeats this last sequence of sensing and counting zero crossings. When the appropriate count is reached corresponding to its 750 millisecond time interval, the system then exits by a flow line 210 and moves into the logic sequence shown in FIG. 8*b*.

Computing circuit 74 now takes the number of speed pulse signals which has been loaded into the speed pickup counter and it averages these with the preceding three values of this count to provide an average of the preceding four speed counts. This average speed is then compared to a predetermined value. If the value has not exceeded a predetermined limit, no speed value is transferred. If the average speed should, on the other hand, exceed the predetermined value, the computed average speed is compared to the preceding computed average bake time. If the newly computed average bake time does not exceed the current display time by more than 2.5%, for example, the system determines whether the static/dynamic switch 196 is in its static position or dynamic position. If it is in its static position, no update of the display of bake time is transmitted to the display driver and correspondingly to the display. However, if the static/dynamic switch has been depressed indicating the dynamic mode, the system will branch, compute and display the actual bake time as computed by the computing circuit 74. This will continue for so long as the static/dynamic switch is maintained in its dynamic position.

Alternatively, should the average speed as determined from the average counts received from the speed pickup 52 exceed a 2.5% change from the currently displayed bake time, the system is again activated to go into a logic sequence to update the display for the newly computed actual bake time of the oven. This will occur on the basis of exits from the decision triangles or diamonds 212, 214. This sequence, which is basically computational, consists of reading data derived from the settings of the constants switches 92 and preprogrammed computational constants loaded into the computing circuit 74. This information is then combined to compute the actual bake time in minutes and seconds and simultaneously provides an instruction to the display driver 98 causing it to display the bake time.

The next logical sequence is provided to also provide a temperature indication corresponding to the operating temperature of the oven. This portion of the logic sequence does not form a part of this invention and accordingly is described only briefly. Basically, the sequence is a determination that the oven has taken an appropriate number of readings, averages these readings, compares the readings (a binary coded value) to a temperature look up table (or tables in the event that different temperature scales are provided) and displays the temperature on the appropriate ones of the display elements 100. Once the display has been completed, the system logically exits via flow line 216 returning to the first step of the logic sequence appearing in FIG. 8*a*, specifically, to the logic decision of determining if a zero crossing has been detected.

The complete source program for the microprocessor computing circuit 74 is attached to this specification as appendix A from whence details of the computational programming will be apparent to those skilled in the art.

In the above description, and with reference again to FIG. 4, it will be seen that the system computes an average bake time for the oven based upon the number of pulses generated in a predetermined amount of time by the speed pickup 52. This average value is indicated by the dotted line 218 in FIG. 4. This average value is the computed average derived from accumulated instantaneous speed readings and are indicated in the solid line in FIG. 4. This average speed value, shown as dashed lines, is in turn compared in terms of a speed change to a predetermined speed change limit as indicated by limit lines 220, 222. If these changes exceed the currently displayed value, indicated by line 224 by a predetermined "window" (2.5% in the working embodiment), the system computes and displays an updated indication of the bake time. Conversely, if the computed average speed (or bake time) is within the 2.5% upper and lower limits, the system provides no updated display of bake time. Correspondingly, an operator will see an indication of bake time only when the bake time varies from the currently displayed bake time by the prescribed limits. Alternatively, if the operator depresses the static/dynamic switch, the average bake time is displayed constantly thereby providing an indication for the operator from which he can make appropriate adjustments to the set point feed back control system used to control the oven drive motor 46. Appropriate calibrations of this control will enable the operator to make appropriate adjustments in the motor control set point based upon the deviation between the actual average bake time and the set bake time.

It will also be observed from the above description that the speed and bake time are derived directly from the motor output shaft 50 which, because of its direct connection to the oven conveyor, provides a positive indication of bake time as opposed to an anticipated value as would occur in prior art systems in which a value such as armature voltage is monitored.

The speed pickup, frequency doubling circuitry, and derivation of precise time constants from line voltage are also unique in the use of low cost components which nonetheless provide highly accurate and reliable values for the computations.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and falls within the limits of the appended claims.

What is claimed is:

1. A bake time display system in a food cooking oven which includes a drive motor and a food conveyor comprising: speed transduceer means operatively coupled to the motor and conveyor of the cooking oven for generating a speed signal proportional to the speed of said conveyor, programmed computing circuit means connected to receive said speed signal for obtaining a plurality of speed samples and computing therefrom the average baking time of food transported through said oven on said conveyor and displaying said computed average baking time on a visual display, said computing means periodically and repetitively computing the average baking time and comparing each computed average baking time to the baking time currently displayed and updating the displayed baking time with the baking time most recently computed if the most recently computed baking time differs from the display baking time by more than a predetermined limit.

2. The display system of claim 1, wherein said speed transducer means includes a rotatable slotted member having a plurality of radially extending, circumferentially spaced apertures therein, and a light source and an optical interrupter operable between alternate conductive states in response to the presence and absence of light thereon mounted in optical alignment adjacent opposite surfaces of said member.

3. The display system of claim 1 wherein said speed transducer means further includes a pulse generating circuit connected to the output of an optical interrupter connected to said motor and conveyor for generating a plurality of pulses constituting said speed signal in response to each change in conductive state in said optical interrupter.

4. The display system of claim 3 wherein said pulse generating circuit includes a operational amplifier and an coupling circuit connecting the input of said operational amplifier to the output of said optical interrupter.

5. The display system of claim 4 wherein said speed transducer means further includes a frequency doubling circuit means connected to said pulse generating circuit for generating said speed pulse signal in response to the output pulse from said pulse generating circuit.

6. The display system of claim 3 wherein said computing circuit means includes a speed pulse counter for receiving and accumulating said speed pulse signal, said computing circuit means being programmed to compute therefrom the average baking time of said oven over a predetermined number of timing intervals.

7. The display system of claim 1 wherein said computing circuit means is further programmed to compute average baking time by averaging the current bake time and a plurality of the previously computed baking time values.

8. The display system of claim 1 further including a static/dynamic switch operable between static and dynamic positions, said computing circuit means being connected to said static/dynamic switch and being responsive to operation thereof into said dynamic position to display the average baking time just computed regardless of whether the average baking time just computed differs from the currently displayed baking time by the predetermined limit.

9. The display system of claim 1 including constants switch means connected to said programmed computing circuit means for altering the operation of said computing circuit means to adapt to changes in the oven configuration, said constants switch means comprising a plurality of two position, manually operable switches wherein the position of one of said switches corresponds to one of two available line frequencies, and a combination of a plurality of other of said switches corresponds to a predetermined combination of motor speed and gear ratio parameters of said oven.

10. The display system of claim 1 wherein said computing circuit means includes a timing interval counter means for counting timing intervals and being programmed to respond to the occurrence of a predetermined number thereof to compute said current average bake time.

11. The display system of claim 1 including a manually operable motor speed control for controlling the speed of said motor.

12. The display system of claim 1 wherein said display includes a plurality of decimal display devices for generating a visual display of said average bake time.

13. A bake time display system for use on a food cooking oven which includes a drive motor and a food conveyor comprising: speed transducer means operatively coupled to the motor of a cooking oven for generating a speed pulse signal proportional in frequency to the speed of said conveyor, timing circuit means for generating a timing signal at predetermined time intervals, a microprocessor computing circuit means including a memory having a source program loaded therein, said computing circuit means being connected to said speed transducer means and said timing circuit means to receive a plurality of samples of said speed pulse signal and said timing signal, said computing circuit repetitively computing in response thereto the average bake time of food passing through a food cooking oven on said conveyor and generating a new average bake time signal when the value of said average bake time differs from a previously computed and currently displayed bake time signal by a predetermined limit, and including a display circuit means for displaying the new average bake time signal.

14. The display system of claim 13 wherein said computing circuit means includes a speed pulse counter for receiving and accumulating said speed pulse signal and being programmed to compute therefrom the average bake time of said oven over a predetermined number of said time intervals.

15. The display system of claim 13 wherein said computing circuit means is further programmed to compute the average of the current average bake time and a plurality of the previous values thereof.

16. The display system of claim 13 further including a static/dynamic switch operable between static and dynamic positions, said computing circuit means being connected to said static/dynamic switch and being responsive to operation thereof into said dynamic position to generate new said average bake time output signals continuously regardless of the value by which the average bake time computed may differ from the currently displayed new bake time signal, and including a manually operated motor speed control device.

17. The display system of claim 16 further including a plurality of manually operable constant switch means for generating one of a predetermined plurality of binary coded signals corresponding to oven motor and conveyor parameters.

18. A bake time display system in a food cooking oven which includes a drive motor and a food conveyor comprising: speed transducer means operatively mechanically coupled to the motor and conveyor of a cooking oven for generating a speed pulse signal responsive to and proportional in frequency to the speed of said conveyor, a programmed microprocessor computing circuit means connected to said speed transducer means to receive a plurality of samples of said speed pulse signal for computing the average baking time of food passing through a food cooking oven on a conveyor and generating an average baking time signal therefrom, and further including display circuit means coupled to said microprocessor computing circuit means to receive said average baking time output signals for producing visible display of the value thereof.

19. The display system of claim 18 wherein said microprocessor computing circuit means is programmed to automatically update the displayed average baking time signals only when the said average baking time differs from a previously displayed average baking time by a predetermined value.

20. The display system of claim 19 further including a static/dynamic switch means connected to said microprocessor computing circuit means for causing, when said static/dynamic switch means is operated, said microprocessor computing circuit means to continuously update said display circuit means to display each new computed average baking time regardless of whether each new computed average baking time differs from the previously displayed baking time by the predetermined value.

* * * * *

UNITED STATES PATENT AND TRADEMARK OFFICE

CERTIFICATE OF CORRECTION

PATENT NO. : 4,615,014

DATED : September 30, 1986

INVENTOR(S) : Richard W. Gigandet et al

It is certified that error appears in the above-identified patent and that said Letters Patent is hereby corrected as shown below:

Claim 1, Col. 10, line 23, change "transduceer" to --transducer--.

Signed and Sealed this

Seventeenth Day of February, 1987

*Attest:*

DONALD J. QUIGG

*Attesting Officer* *Commissioner of Patents and Trademarks*